Dec. 6, 1966   L. R. PADBERG, JR   3,290,643
SIMPLIFIED METHOD OF SUBMARINE DEPTH DETERMINATION
Filed May 25, 1955   2 Sheets-Sheet 1

INVENTOR.
LOUIS R. PADBERG, JR.
BY George Sipkin
George E. Pearson
ATTORNEYS

Dec. 6, 1966   L. R. PADBERG, JR   3,290,643
SIMPLIFIED METHOD OF SUBMARINE DEPTH DETERMINATION
Filed May 25, 1955   2 Sheets-Sheet 2

INVENTOR.
LOUIS R. PADBERG, JR

United States Patent Office 3,290,643
Patented Dec. 6, 1966

3,290,643
SIMPLIFIED METHOD OF SUBMARINE DEPTH
DETERMINATION
Louis R. Padberg, Jr., 4126 Middlesex Drive,
San Diego, Calif.
Filed May 25, 1955, Ser. No. 511,136
3 Claims. (Cl. 340—3)

The invention described herein may be manufactured and used by or for the Government of the United States of America for governmental purposes without the payment of any royalties thereon or therefor.

This invention relates to a method for determining the depth of a submerged object and more particularly to a method suitable for use by an attacking vessel for determining the depth of a hostile subbmarine.

Echo ranging systems are commonly employed to determine the range and bearing of underwater targets. For a properly directed attack upon a submerged submarine, it is also necessary that the depth of the target be known. The direction and ranging equipment yields information concerning two coordinates defining the horizontal position of the target but the third coordinate or target depth has been obtained through the use of additional and more complicated apparatus. One such apparatus embodies a separate tilting projector which provides a measure of target range and vertical angle. The target depth is then determined by trigonometry based on a measured angle and hypotenuse of a right triangle or by mechanical means which operates on this same trigonometric principle. Such systems require compensation for thermal bending of the sound beam and depth information is frequently inaccurate and is only available at small ranges.

The method of this invention provides a measurement along a vertical path which is unaffected by thermal gradients. No extra projector or additional tilting equipment and computers are required. The particular method is based on a pulse echo at beam aspect, of the target submarine, namely an energy propagating path perpendicular to the longitudinal axis of the submarine at its widest part or beam. The present invention comprises the steps of projecting at beam aspect of the target submarine an energy pulse of critical length, receiving an echo of the pulse reflected directly from the target, receiving a second echo of the same pulse which is reflected from the target vertically to the surface and back and thence to the receiver, and measuring the time interval between the two echoes. The phrase, at beam aspect, is intended to define that particular orientation of target submarine and transducer on a search vessel wherein the pulses from the transducer impinge at the widest part on the longitudinal axis of the target submarine; the pulses are reflected perpendicularly as echo pulses from this part and the transducer on the search vessel is positioned so that it receives there echo pulses optionally, i.e., the receiving transducer being perpendicular to the echo pulses.

It is an object of this invention to provide a method of accurately determining depth of a submerged object.

Another object of this invention is the provision of a method of depth determination which can be practiced with equipment equally capable of yielding target range and direction information.

A further object of this invention is the provision of a simplified method of depth determination which utilizes measurements made along a vertical path.

Other objects and many of the attendant advantages of this invention will be readily appreciated as the same becomes better understood by reference to the following detailed description when considered in connection with the accompanying drawings wherein.

Figure 4:
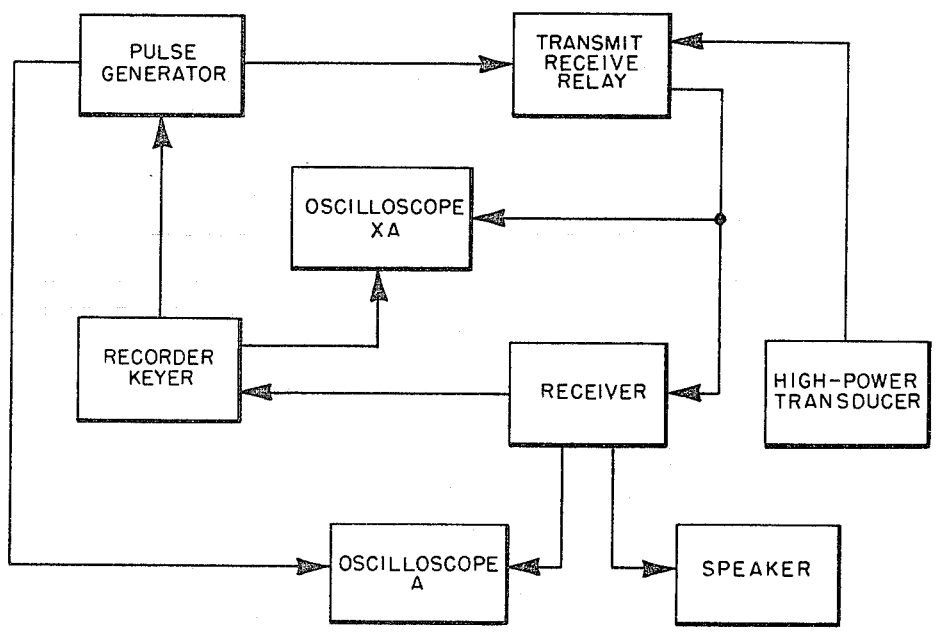
FIG. 4 is a block diagram of one form of equipment with which the method of this invention may be practiced.

A close inspection of the displays of submarine echoes produced on short pulse high power sonar equipment has revealed that a new and different echo, usually of smaller amplitude, frequently appears beyond the main echo when the submarine submerges below periscope depth. Investigation has identified this display as the surface echo. The presence of this echo may be explained in theory. At beam aspect, when the energy pulse is directed along a path transverse to the longitudinal axis of the submarine, the proportion of reflected energy is at a maximum and the target strength of the echo is greatest. A portion of the energy striking the submarine at beam aspect is reflected upward to the water surface, reflected from the surface to the submarine and thence directly to the receiving hydrophone. Since the only efficient path between the submarine and the surface is a vertical path, a predominant echo is returned over this path to be received by suitable equipment together with the echo reflected directly from the submarine for a precise measurement of the depth of the submarine. The surface echo is essentially independent of thermal bending which makes conventional depth measurement difficult Eqiupment for practicing the method of this invention may comprise any conventional sonic echo ranging apparatus having suitably large scale displays and capable of transmitting pulses of sufficient minimum length. A preferred form of such equipment is shown in FIG. 4. This system includes a projecting and receiving transducer 12 (FIG. 1) which is fed through a transmit receive relay with high power fixed frequency pulses of a selectively variable length generated by a recorder keyed pulse generator. A long range slow sweep oscilloscope A is keyed by the pulse generator and provides a display of echoes which are received by the transducer and passed through the transmit receive relay to the filtering and heterodyning receiver. The receiver feeds the amplified echoes to the recorder keyer, speaker and oscilloscope A which are utilized for direction and range finding, the transducer orientation being known. A fast sweep oscilloscope XA which is gated by the recorder keyer to produce an expanded display of an echo at a selected range may be fed with echoes at carrier frequency bypassing the receiver as shown or, alternately, may be fed from the output of the receiver. The recorder keyer includes means for cyclically actuating a gating switch which upon closing initiates the fast sweep of oscilloscope XA and upon opening terminates the sweep. The sweep of oscilloscope XA is much faster than that of oscilloscope A and, for example, may have a duration approximately equal to the time required for the acoustic energy pulse to travel about 700 feet to produce a display of a range area about 300 feet wide. The pulse generator may selectively produce many different pulse lengths from less than one millisecond to more than 100 milliseconds duration.

Figure 1:
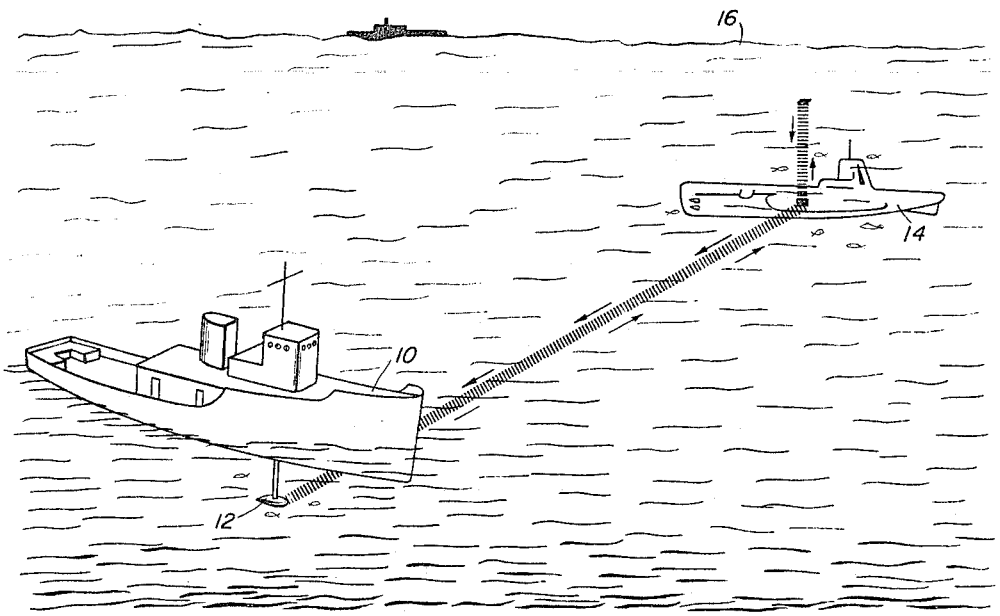
FIG. 1 is a pictorial representation of the paths of travel of the transmitted pulse and its echoes.

The paths of energy travel are indicated in FIG. 1 which depicts a surface vessel 10 carrying echo ranging equipment which includes a projector-receiver 12. The projector-receiver may be a crystal or magnetostrictive transducer which will vibrate in response to varying electric signals supplied thereto and produce a beam of sonic or compressional wave energy pulses which travel to the submerged submarine 14. A portion of the energy striking the submarine is reflected directly to transducer 12 or to a separate hydrophone or receiving transducer (not shown). The projector-receiver 12 or the receiving hydrophone converts the reflected compressional wave energy to electric energy signals which control the display sections of the echo ranging equipment on vessel 10. A second portion of the energy striking the submarine is reflected to the water surface 16, reflected therefrom to the submarine and thence to the transducer 12 which produces a second electric energy signal in response to the surface echo.

Figure 3:
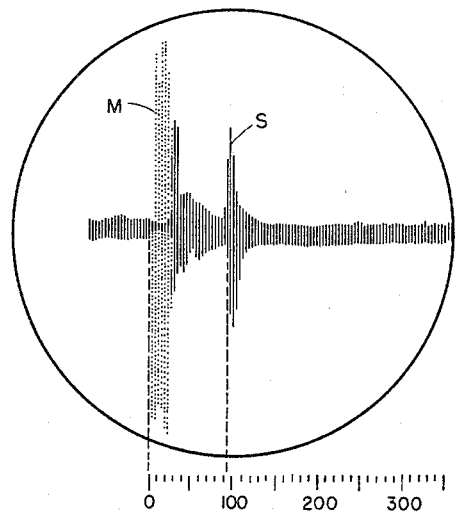
FIG. 3 shows an expanded oscilloscope display of the echoes.
Figure 2:
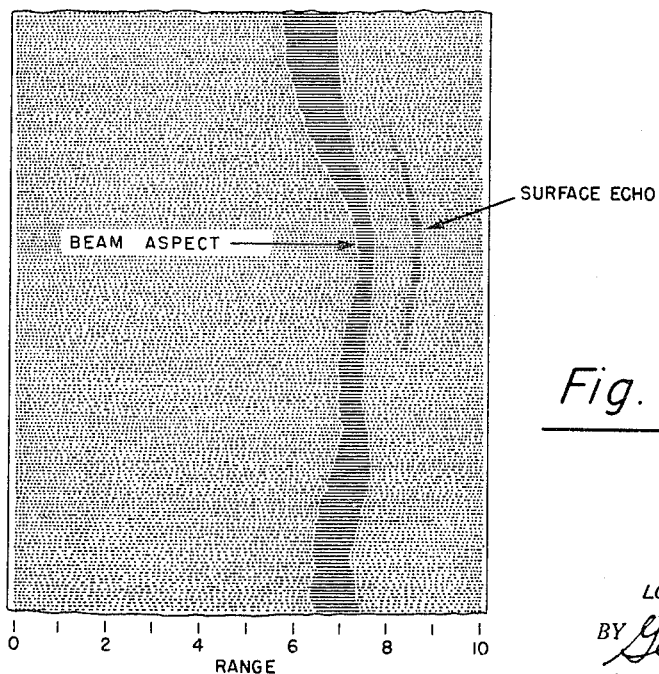
FIG. 2 shows the echoes appearing on an echo ranging recorder.

A recorder trace obtained by partially circling a target submarine is shown in FIG. 2 and illustrates the minimum main echo length which occurs at approximately beam aspect. It will be seen that the surface echo is obtained only at or near beam aspect and appears slightly beyond the main echo. The main target echo at other than beam aspects will have a length which approaches the length of the target, approximately 300 feet. Since a submarine seldom travels at depth greater than 300 feet and since the surface echo appears beyond the leading edge of the main echo a distance equal to the target depth, a discrete and detectable surface echo seldom will be obtained at other than beam aspect. The critical condition, however, is the relation between main echo length and target depth. The main echo length as measured on the display device must be less than the target depth. For a given transmitted pulse length the echo length is shortest at beam aspect. However, the echo length varies directly with the length of the transmitted pulse so that a decrease in pulse length will produce a corresponding decrease in echo length and yield a discrete surface echo at lesser target depths. It has been found that a transmitted pulse length of 10 milliseconds or more will produce a main echo of such length as to obscure the surface echo. The pulse length must therefore be less than 10 milliseconds and a length of 3 milliseconds is preferred. At periscope depth or below the echo beam aspect has a length of about 30 feet, approximately the width of the submarine. At lesser depths the observed echo length is greater because of the wake of the moving target but visual observation will yield adequate depth information under such conditions. The absence of the surface echo at other than beam aspect is due to the fact that little of the energy striking the submarine is reflected to the surface so that the direction of the transmitted energy beam relative to the target orientation is a factor of critical importance equal to that of pulse length. The surface echo of FIG. 2 was obtained with a pulse length of 3 milliseconds at beam aspect. A third critical factor which varies with target range is pulse power since the surface echo is much weaker than the main target echo. The surface echo can be obtained on conventional equipment at certain ranges when using a pulse of sufficient minimum length to render the surface echo separate and discrete from an echo received directly from the target. The pulse must of course be projected at beam aspect and the receiver gain increased above that which would be considered normal. For accurate measurement of target depth an expanded display such as shown in FIG. 3 is required in order to relatively displace the two echoes for clear measurement of the distance or time interval therebetween.

After contact with the target has been effected through the usual direction and ranging procedures the expanded oscilloscope XA is gated at the target range (i.e., the sweep of the cathode ray tube is caused to be initiated immediately prior to the time of reception of the main echo and caused to be terminated immediately after the time of reception of the surface echo or some correspondingly short time) and the pulse length is decreased if it has been set at 10 milliseconds or more. The orientation of the target submarine is then determined either by the observed direction of target movement or by circling the target for 90° or more to observe the shortest echo length or the direct echo of maximum strength. This latter observation together with the depth measurement is best effected by the use of the display of the expanded oscilloscope XA which will appear as indicated in FIG. 3. The leading edge of the main echo M at beam aspect is aligned with the zero marking on the expanded scale and the position of the leading edge of the surface echo S is noted and directly indicates the target depth. Obviously any suitable method of measuring the time interval between the reception of the main echo and the reception of the surface echo may be used. It will be seen that the equipment produces a first signal M indicative of the distance between the target and the transducer and a second signal indicative of the sum of the distances between the target and transducer and between the target and water surface. It will be readily appreciated that the illustrated equipment is but one form of apparatus with which the method of this invention may be practiced. For example, the two oscilloscopes may be replaced by a single oscilloscope having a variable rate sweep or depth information could be obtained by magnification of the recorder trace in the absence of any oscilloscope. Any suitable means other than the recorder may be used to gate oscilloscope XA.

Under some conditions it is possible to obtain a vertical echo from the bottom. However, except in rare instances, the large distance differential will prevent a bottom echo from being confused with the surface echo. For use of such a bottom echo for depth measurement both the submarine and attacking vessel must be in water of which the relative depths at observed and observing positions are known, or as is more likely, both vessels must be over the same depth and type bottom.

The basic principle of this invention may be utilized for effecting measurement of vertical distances relative to the surface or bottom of a body of liquid. Apparatus for such measurements could include means for generating and receiving a compressional wave energy pulse, such as shown in FIG. 4, a reflecting device to effect the same or similar energy reflections as are effected by the submarine at beam aspect, and means for indicating the relative times of reception of energy reflected directly from the reflecting device and of energy indirectly reflected from the surface by way of the reflecting device. The reflecting device will be spaced horizontally from the pulse generator and transducer, a distance which does not have to be accurately known, and will be oriented and constructed to reflect received compressional wave energy both to the receiver and to the surface or bottom. The two echoes of a single pulse will be displayed as described above to produce a measurement of the vertical distance between the reflecting device and the surface or bottom.

Obviously many modifications and variations of the present invention are possible in the light of the above teachings. It is therefore to be understood that within the scope of the appended claims the invention may be practiced otherwise than as specifically described.

What is claimed is:

1. The method of remotely determining the depth of a submerged submarine comprising circling a target suspected of being a submarine, projecting a series of energy pulses in a plurality of paths respectively converging on said target, determining the paths which yield the direct echo of maximum amplitude designating beam aspect, increasing the pulse strength until a surface echo appears, and reducing the length of said energy pulses until the main echo and surface echo are separated by a time period indicating submarine depth.

2. The method set forth in claim 1 wherein the step of separating the main echo and surface echo for determining the time element indicating submarine depth comprises keying an expanded sweep display device by said direct echo of maximum amplitude, displaying said surface echo on said expanded sweep display device, said surface echo display being separated from the direct echo by a time period indicating submarine depth.

3. The method of remotely determining the depth of a submerged submarine comprising the steps of transmitting a series of energy pulses converging on said submarine, regulating the power of said pulses until a surface echo is received at beam aspect, regulating the length of said pulses to render the surface echo separate and discrete from any echo received directly from said submarine, producing and expanded sweep display of said echoes, and indicating the range distance separating the leading edges of said direct echoes and surface echoes on said expanded sweep display to provide a measure of the depth of said submarine.

References Cited by the Examiner

UNITED STATES PATENTS

| | | | |
|---|---|---|---|
| 2,456,598 | 12/1948 | Schuck | 340—3 |
| 2,566,858 | 9/1951 | Sebring | 340—3 |
| 2,709,796 | 5/1955 | Rodman | 340—3 |
| 2,788,509 | 4/1957 | Bolzmann | 340—3 |

OTHER REFERENCES

Bell Telephone System Technical Publication Monograph B–1543.

Keller, "Submarine Detection by Sonar," Aug. 1947, pages 4–5.

"Echo Depth Sounder," by G. B. Shaw, Electronics magazine, Sept. 1946, pages 88–92.

CHESTER L. JUSTUS, *Primary Examiner.*

NORMAN H. EVANS, *Examiner.*

M. A. MORRISON, P. H. BLAUSTEIN, R. A. KUYPERS, A. S. ODDI, D. G. BREKKE, R. A. FARLEY, *Assistant Examiners.*